(12) United States Patent
Almehio

(10) Patent No.: US 12,262,026 B2
(45) Date of Patent: Mar. 25, 2025

(54) METHOD FOR MANAGING IMAGE DATA AND AUTOMOTIVE LIGHTING DEVICE

(71) Applicant: VALEO VISION, Bobigny (FR)

(72) Inventor: Yasser Almehio, Bobigny (FR)

(73) Assignee: VALEO VISION, Bobigny (FR)

( * ) Notice: Subject to any disclaimer, the term of this patent is extended or adjusted under 35 U.S.C. 154(b) by 214 days.

(21) Appl. No.: 17/784,057

(22) PCT Filed: Dec. 1, 2020

(86) PCT No.: PCT/EP2020/084183
§ 371 (c)(1),
(2) Date: Jun. 9, 2022

(87) PCT Pub. No.: WO2021/115854
PCT Pub. Date: Jun. 17, 2021

(65) Prior Publication Data
US 2023/0041605 A1    Feb. 9, 2023

(30) Foreign Application Priority Data

Dec. 13, 2019   (FR) .................................... 19 14425

(51) Int. Cl.
*H05B 47/105*     (2020.01)
*B60Q 1/14*       (2006.01)
(Continued)

(52) U.S. Cl.
CPC ......... *H04N 19/182* (2014.11); *B60Q 1/1407* (2013.01); *H04N 19/186* (2014.11); *H05B 45/10* (2020.01); *H05B 47/105* (2020.01)

(58) Field of Classification Search
CPC .... H05B 47/18; H05B 47/105; H05B 47/125; B60Q 1/1407; B60Q 1/1423; H04N 19/44;
(Continued)

(56) References Cited

U.S. PATENT DOCUMENTS

| 5,327,254 A | 7/1994 | Daher |
| 6,061,475 A | 5/2000 | Blair |

(Continued)

FOREIGN PATENT DOCUMENTS

| CN | 101023407 A | 8/2007 |
| CN | 104137548 A | 11/2014 |

(Continued)

OTHER PUBLICATIONS

Combined Chinese Office Action and Search Report issued Jan. 19, 2024 in Chinese Patent Application No. 202080085450.9 (with partial English translation, English summary translation, and English translation of Category of Cited Documents), 15 pages.

(Continued)

*Primary Examiner* — Tung X Le
(74) *Attorney, Agent, or Firm* — Oblon, McClelland, Maier & Neustadt, L.L.P.

(57) ABSTRACT

A method for managing image data in an automotive lighting device. This method includes the steps of providing an image pattern, dividing the image pattern in rows or columns of pixels, and providing for each row pattern, a plurality of linear segments, each linear segment is characterized by two values. The data of the linear segments is compressed, and the compressed data is sent to the light module. The invention also provides an automotive lighting device for performing the steps of such a method.

18 Claims, 4 Drawing Sheets

(51) Int. Cl.
  *H04N 19/182* (2014.01)
  *H04N 19/186* (2014.01)
  *H05B 45/10* (2020.01)

(58) Field of Classification Search
  CPC .... H04N 19/59; H04N 19/182; H04N 19/186; H04N 19/436
  See application file for complete search history.

(56) References Cited

U.S. PATENT DOCUMENTS

| | | | |
|---|---|---|---|
| 6,654,713 | B1 | 11/2003 | Rethman |
| 7,349,574 | B1 | 3/2008 | Sodini et al. |
| 11,164,287 | B2* | 11/2021 | Bonne .................. G09G 3/2088 |
| 2004/0143380 | A1 | 7/2004 | Stam et al. |
| 2008/0291295 | A1* | 11/2008 | Kato ...................... H04N 19/17 |
| | | | 382/254 |
| 2013/0027557 | A1* | 1/2013 | Hirai ...................... G06V 20/56 |
| | | | 348/148 |
| 2017/0078643 | A1* | 3/2017 | Lo ........................ H04N 13/128 |
| 2017/0141847 | A1 | 5/2017 | De Bruijn |
| 2017/0280079 | A1* | 9/2017 | Fu .......................... G06F 1/3234 |
| 2019/0199952 | A1* | 6/2019 | Wan ...................... G03B 13/36 |
| 2019/0230373 | A1* | 7/2019 | Kurokawa ............. H04N 19/44 |
| 2020/0108766 | A1* | 4/2020 | Shibata .................. G06V 20/56 |

FOREIGN PATENT DOCUMENTS

| | | |
|---|---|---|
| DE | 10 2018 014 330 B3 | 4/2018 |
| WO | WO 2004/034183 A2 | 4/2004 |
| WO | WO 2015/193042 A1 | 12/2015 |

OTHER PUBLICATIONS

International Search Report issued Feb. 17, 2021 in PCT/EP2020/084183 filed on Dec. 1, 2020, 4 pages.

* cited by examiner

[Fig. 1]
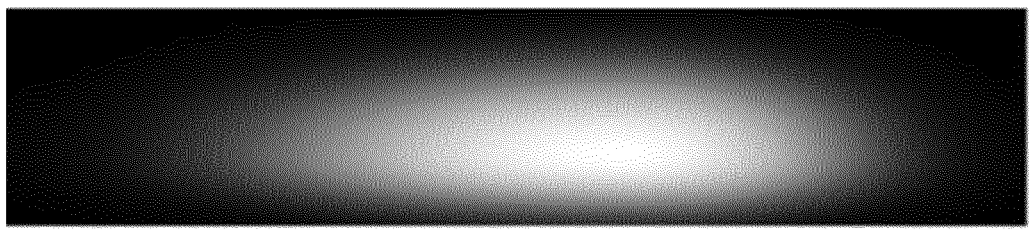

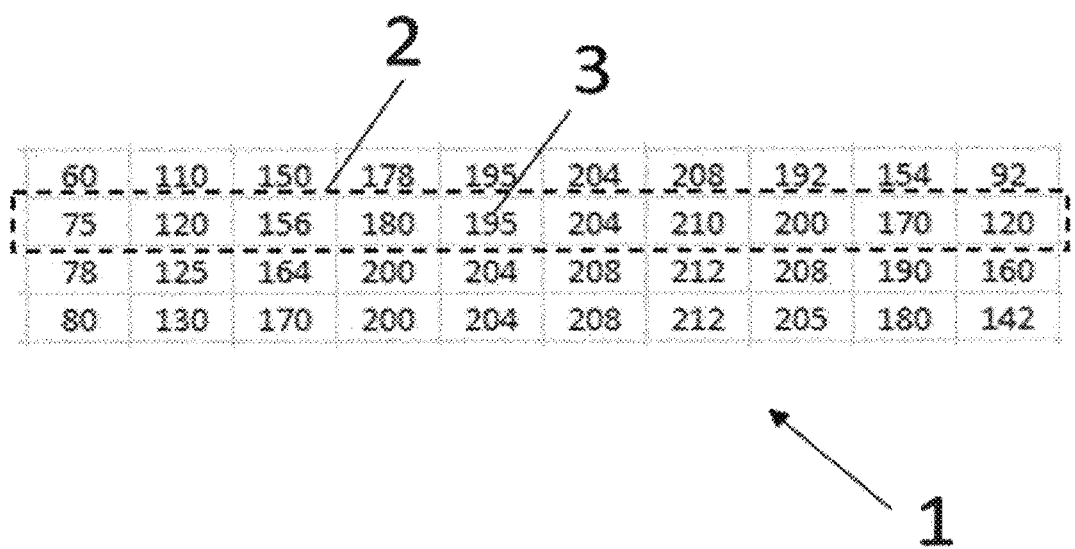
[Fig. 2]

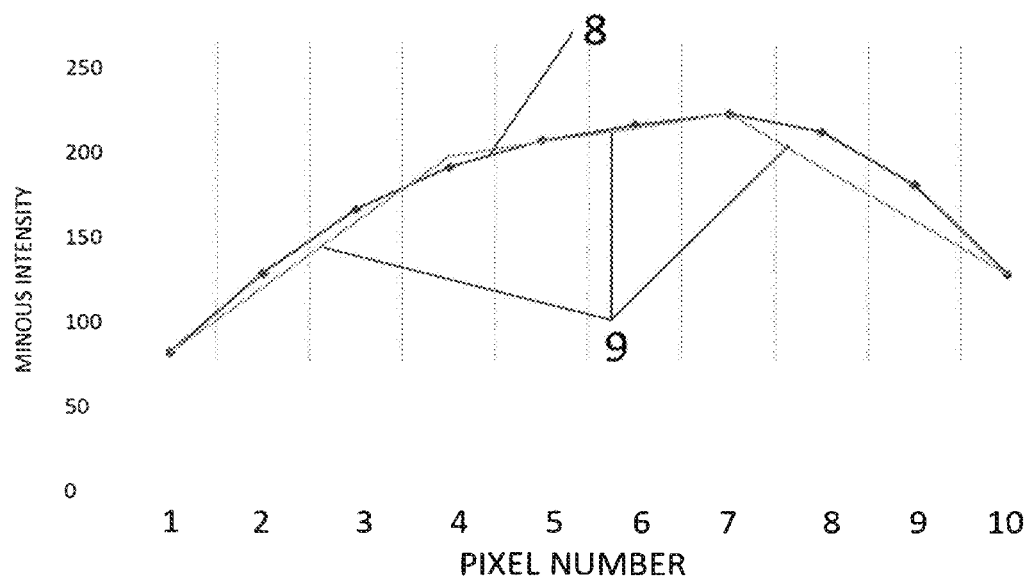
[Fig. 3]

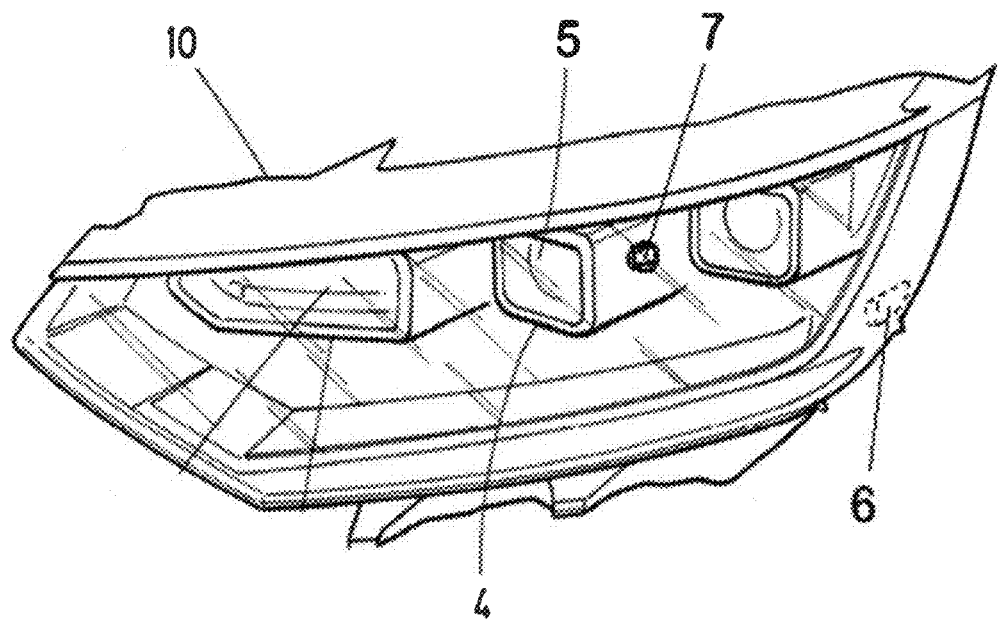
[Fig. 4]

METHOD FOR MANAGING IMAGE DATA AND AUTOMOTIVE LIGHTING DEVICE

This invention is related to the field of automotive lighting devices, and more particularly, to the management of the electronic data derived from the control of the lighting sources.

Current lighting devices comprises an increasing number of light sources which has to be controlled, to provide adaptive lighting functionalities.

This number of light sources involves a big amount of data, which has to be managed by the control unit. The CAN protocol is often used, in some of their variants (CAN-FD is one of the most used ones) to transfer data between the PCM and the light module. However, some car manufacturers decide to limit the bandwidth of the CAN protocol, and this affects the management operations, which usually requires about 5 Mbps.

Current compression methods are not very efficient for high beam patterns, and this compromises the bandwidth reduction which is requested by car manufacturers.

This problem is even worse with the modern high resolution modules, where the information amount is much higher, while the limit in the bandwidth does not increase.

A solution for this problem is sought.

The invention provides a solution for these problems by means of a method for managing image data in an automotive lighting device, the method comprising the steps of
- providing an image pattern comprising a plurality of pixels, wherein each pixel is characterized by a numeric value related to the luminous intensity of the pixel;
- dividing the image pattern in rows or columns of pixels, thus creating a plurality of row patterns;
- providing, for each row pattern, a plurality of linear segments, each linear segment providing a linear approximation to a group of pixels;
- characterizing each linear segment by two values;
- compressing the values of the linear segments; and
- send the compressed data to the light module.

This method is aimed to manage the image data which is exchanged between a control unit and a light module. The control unit is in charge of calculating the image pattern and the compression data, and may be located in any position of the automotive vehicle, not necessarily physically inside the lighting device. The lighting module is aimed to provide a light pattern, either for lighting or signalling, and is located inside the lighting device.

The main advantage of this method is the increase in the compression rate, due to the fact that the linear segments comprises a lower amount of data compared to the original pixels replaced thereby, especially when the image pattern is referred to a high beam pattern. This data compression is based on the fact that each linearized segment (which in turn provides data saving with respect to the original set of data) is characterized only by two values.

In some particular embodiments, the light pixels of the image pattern are grey scale pixels, and more particularly, the luminous intensity of each pixel is according to a scale from 0 to 255.

Light modules usually define the light pattern on a grey scale, where the luminous intensity is graded from 0 to 255. This is a way of quantifying the light pattern so that it becomes able to be converted into light data, and then transmitted and managed by the control unit of the vehicle.

In some particular embodiments, each linear segment has a start pixel and an end pixel, but is characterized by the numeric value of the start pixel and the number of pixels comprised between the start pixel and the end pixel.

This is a way of saving data: for example, a string of n values is replaced by only 2 values: the numeric value of the luminous intensity in the first pixel and the number of pixels between the first pixel and the last pixel. If there are regions where a linear approximation is valid for a portion of 30 or 40 pixels, the data saving is evident.

In some particular embodiments, the numeric value of the start pixel of the linear segment coincides with the numeric value of the end pixel of a previous linear segment.

This is one way of providing information to the linearizing method. Since the last pixel of one segment has the same numeric value as the first pixel of the next segment, there is no need to provide this numeric value twice, it is enough to provide only the numeric values of the first pixel of each segment.

In some particular embodiments, the method further comprises the step of decompressing the compressed data.

This step is convenient when the original image is to be projected by the light module.

In some particular embodiments, the compressed data is related only to a particular portion of the image pattern.

This cropping step is useful when a big portion of the image is completely dark, so that the compression stage is focused only on the portion which include representative values.

In a second inventive aspect, the invention provides a lighting device comprising
- a light module comprising a plurality of light sources; and
- a control unit to carry out the steps of a method according to the first inventive aspect.

This lighting device is able to operate with a lower bandwidth than the traditional ones.

In some particular embodiments, the light module further comprises a processor unit, the processor unit being configured to decompress the compressed data.

With a decompression stage in the proper light module, the bandwidth is narrowed until the module itself.

In some particular embodiments, the light sources are solid-state light sources, such as LEDs.

The term "solid state" refers to light emitted by solid-state electroluminescence, which uses semiconductors to convert electricity into light. Compared to incandescent lighting, solid state lighting creates visible light with reduced heat generation and less energy dissipation. The typically small mass of a solid-state electronic lighting device provides for greater resistance to shock and vibration compared to brittle glass tubes/bulbs and long, thin filament wires. They also eliminate filament evaporation, potentially increasing the life span of the illumination device. Some examples of these types of lighting comprise semiconductor light-emitting diodes (LEDs), organic light-emitting diodes (OLED), or polymer light-emitting diodes (PLED) as sources of illumination rather than electrical filaments, plasma or gas.

Unless otherwise defined, all terms (including technical and scientific terms) used herein are to be interpreted as is customary in the art. It will be further understood that terms in common usage should also be interpreted as is customary in the relevant art and not in an idealised or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures:

FIG. 1 shows a first image of the photometry of a high beam module which is projected by an automotive lighting device according to the invention.

FIG. 2 shows a portion of a pixel matrix representing the photometry of [FIG. 1].

FIG. 3 shows a graphic representation of a row pattern of a method according to the invention.

FIG. 4 shows an automotive lighting device according to the invention.

In these figures, the following reference numbers have been used:

1 Image pattern
2 Row pattern
3 Pixel of the image pattern
4 Light module
5 LEDs
6 Control unit
7 Processor unit
8 Original light data
9 Linearized segments
10 Automotive lighting device
100 Automotive vehicle The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included.

[FIG. 1] shows a first image of the photometry of a high beam module which is to be projected by an automotive lighting device according to the invention.

This first image may be divided into pixels and each pixel may be characterized by its luminous intensity, in a scale from 0, which would correspond to black, to 255, which would correspond to white.

[FIG. 2] shows a portion of such a pixel matrix, called image pattern 1. Each pixel 3 of this image pattern 1 is characterized by a number according to the aforementioned scale. The compression of this image pattern 1 according to commercially available software products would offer a compression rate lower than 50%, which is unacceptable by some car manufacturers.

In this image, the pixels are divided into row patterns 2. Each pattern comprises a string of data, with numbers between 0 and 255, depending on the luminous intensity of the associated pixels. These values are provided for the sake of understanding the invention, but the real rows may comprise hundred of values.

[FIG. 3] shows a graphic representation of one of these row patterns. The horizontal axis represents the pixel number and the vertical axis represent the luminous intensity, in the scale from 0 to 255. The original set of data 8 is represented, and there are three further linear segments 9 which try to provide an approximation to different groups of pixels.

The data of the pixels is replaced by the data of the linear segments, which involves a considerable data saving.

Thus, instead of the numerical values of the pixels 1 to 4, only the numerical value of the first pixel and the number of pixels of this segment (four) will be part of the compressed data. Then, for the next segment, only the value in pixel 4 and the number of pixels of the next segment (four) will be part of the compressed data. Finally, for the last segment, only the value in pixel 7 and the number of pixels of the last segment (four) will be part of the compressed data. In this case, the method has replaced 10 values by 6 values, but in real cases, the compression rate may reach 80-90%, since there are a far greater amount of pixels and the segments usually cover tenths of pixels.

Once these steps of linearization are carried out the data is compressed, thus creating compressed data.

The compression rate of these data is much higher than in the event the same compression method was applied to the original. As a consequence, this compressed data may be sent to the light module compelling with restrictive conditions about the bandwidth.

[FIG. 4] shows an automotive lighting device according to the invention, this lighting device comprising:
a light module 4 comprising a plurality of LEDs 5;
a control unit 6 to carry out the compression steps described in the previous figures, generating the compressed data; and
a processor unit 7, the processor unit 7 being configured to decompress the compressed data, this processor unit being located in the light module 4.

This light module would achieve a good quality projection with an improved transmission bandwidth.

The invention claimed is:

1. A method for managing image data in an automotive lighting device, the method comprising the steps of:
providing an image pattern comprising a plurality of pixels, wherein each pixel is characterized by a numeric value related to a luminous intensity of the pixel;
dividing the image pattern in rows or columns of pixels, thus creating a plurality of row patterns;
providing, for each row pattern, a plurality of linear segments, each linear segment providing a linear approximation to a group of pixels based on the luminous intensity of each pixel;
characterizing each linear segment by two values;
compressing the values of the linear segments; and
sending the compressed data to a light module of the automotive lighting device.

2. The method according to claim 1, wherein the pixels of the image pattern are greyscale pixels, and the luminous intensity of each pixel is characterized by a number according to a scale from 0 to 255.

3. The method according to claim 2, wherein each linear segment has a start pixel and an end pixel, but is characterized by the numeric value of the start pixel and a number of pixels comprised between the start pixel and the end pixel.

4. The method according to claim 3, wherein the numeric value of the start pixel of the linear segment coincides with the numeric value of the end pixel of a previous linear segment.

5. The method according to claim 4, wherein each linear segment has a start pixel and an end pixel, but is characterized by the numeric value of the start pixel and the number of pixels comprised between the start pixel and the end pixel.

6. The method according to claim 4, further comprising the step of decompressing the compressed data.

7. The method according to claim 4, wherein the compressed data is related only to a particular portion of the image pattern.

8. The method according to claim 3, further comprising the step of decompressing the compressed data.

9. The method according to claim 3, wherein the compressed data is related only to a particular portion of the image pattern.

10. The automotive lighting device comprising:
    a control unit to carry out the steps of the method according to claim 3,
    wherein the light module comprises a plurality of light sources.

11. The automotive lighting device according to claim 10, wherein the light sources are solid-state light sources.

12. The method according to claim 2, further comprising the step of decompressing the compressed data.

13. The method according to claim 2, wherein the compressed data is related only to a particular portion of the image pattern.

14. The automotive lighting device comprising:
    a control unit to carry out the steps of the method according to claim 2,
    wherein the light module comprises a plurality of light sources.

15. The automotive lighting device according to claim 14, wherein the light module further comprises a processor unit, the processor unit being configured to decompress the compressed data.

16. The automotive lighting device according to claim 14, wherein the light sources are solid-state light sources.

17. The automotive lighting device comprising:
    a control unit to carry out the steps of the method according to claim 1,
    wherein the light module comprises a plurality of light sources.

18. The automotive lighting device according to claim 17, wherein the light sources are solid-state light sources.

* * * * *